United States Patent
Wan et al.

(10) Patent No.: US 9,414,076 B2
(45) Date of Patent: Aug. 9, 2016

(54) SYSTEM ARCHITECTURE FOR DISTRIBUTED CODING

(71) Applicant: Broadcom Corporation, Irvine, CA (US)

(72) Inventors: Wade Keith Wan, Orange, CA (US); Xuemin Chen, Rancho Santa Fe, CA (US); Minhua Zhou, San Diego, CA (US); Peisong Chen, San Diego, CA (US); Zhijie Yang, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 0 days.

(21) Appl. No.: 14/561,722

(22) Filed: Dec. 5, 2014

(65) Prior Publication Data

US 2016/0127733 A1 May 5, 2016

Related U.S. Application Data

(60) Provisional application No. 62/074,427, filed on Nov. 3, 2014.

(51) Int. Cl.
*G06K 7/00* (2006.01)
*H04N 19/156* (2014.01)
*H04N 19/127* (2014.01)
*H04N 19/184* (2014.01)
*H04N 19/139* (2014.01)

(52) U.S. Cl.
CPC ........... *H04N 19/156* (2014.11); *H04N 19/127* (2014.11); *H04N 19/139* (2014.11); *H04N 19/184* (2014.11)

(58) Field of Classification Search
USPC ........... 235/375, 376, 435, 487; 705/5, 35–45
See application file for complete search history.

(56) References Cited

U.S. PATENT DOCUMENTS

| | | | | |
|---|---|---|---|---|
| 2007/0016802 A1* | 1/2007 | Wingert | ............... | H04N 7/1675 713/193 |
| 2013/0246077 A1* | 9/2013 | Riedmiller | ............ | G10L 19/008 704/500 |
| 2013/0246510 A1* | 9/2013 | Shimamoto | ........... | H04L 65/602 709/203 |

* cited by examiner

Primary Examiner — Matthew Mikels
(74) Attorney, Agent, or Firm — Brinks Gilson & Lione

(57) ABSTRACT

A system may receive an input stream for a coding operation by a coding device. The system may determine a processing device to assist the coding device with the coding operation. The processing device may generate an indicator containing coding information or other coding assistance by processing the input stream. The processing device may send the indicator to the coding device. In some cases, the indicator may be embedded in the metadata of the stream by the processing device. The indicator may be extracted by the coding device. After reception of the indicator, the coding device may execute the coding task while using the information in the indicator to assist.

20 Claims, 7 Drawing Sheets

SYSTEM ARCHITECTURE FOR DISTRIBUTED CODING

PRIORITY CLAIM

This application claims priority to provisional application Ser. No. 62/074,427, filed Nov. 3, 2014.

TECHNICAL FIELD

This disclosure relates predictive video encoding. This disclosure also relates to implementing distributed video encoding.

BACKGROUND

Rapid advances in electronics and communication technologies, driven by immense customer demand, have resulted in the worldwide adoption of devices that display a wide variety of video content. Examples of such devices include smartphones, flat screen televisions, and tablet computers. Improvements in video processing techniques will continue to enhance the capabilities of these devices.

DETAILED DESCRIPTION

The disclosure below discusses techniques and architectures for distribution of coding tasks among multiple processing devices. For example, a coding task, such as transcoding, encoding, decoding, or other coding task to be performed by a coding device may be assisted by another processing device. In some cases, the assisting processing device may be a device other than a specialized coding processing device, such as a general purpose processor, an audio processor, a graphics processor, or other processing device. The assisting device may send a coding content indicator to the coding device which may reduce the processing burden on the coding device while completing the coding task. The processing device and coding device may include physically separate processing circuits. For example, the coding and processing devices may include separate processing cores fabricated on a single die and/or situated on the same CPU. In another example, the coding and processing devices may include geographically separate devices communicating over a wide area network. In another example, the distribution techniques and architectures may be used to implement coding system virtualization. The virtualized system may allow for dynamic distribution of video coding function over network nodes (e.g., in a home network, enterprise network, and/or other network).

Figure 1:
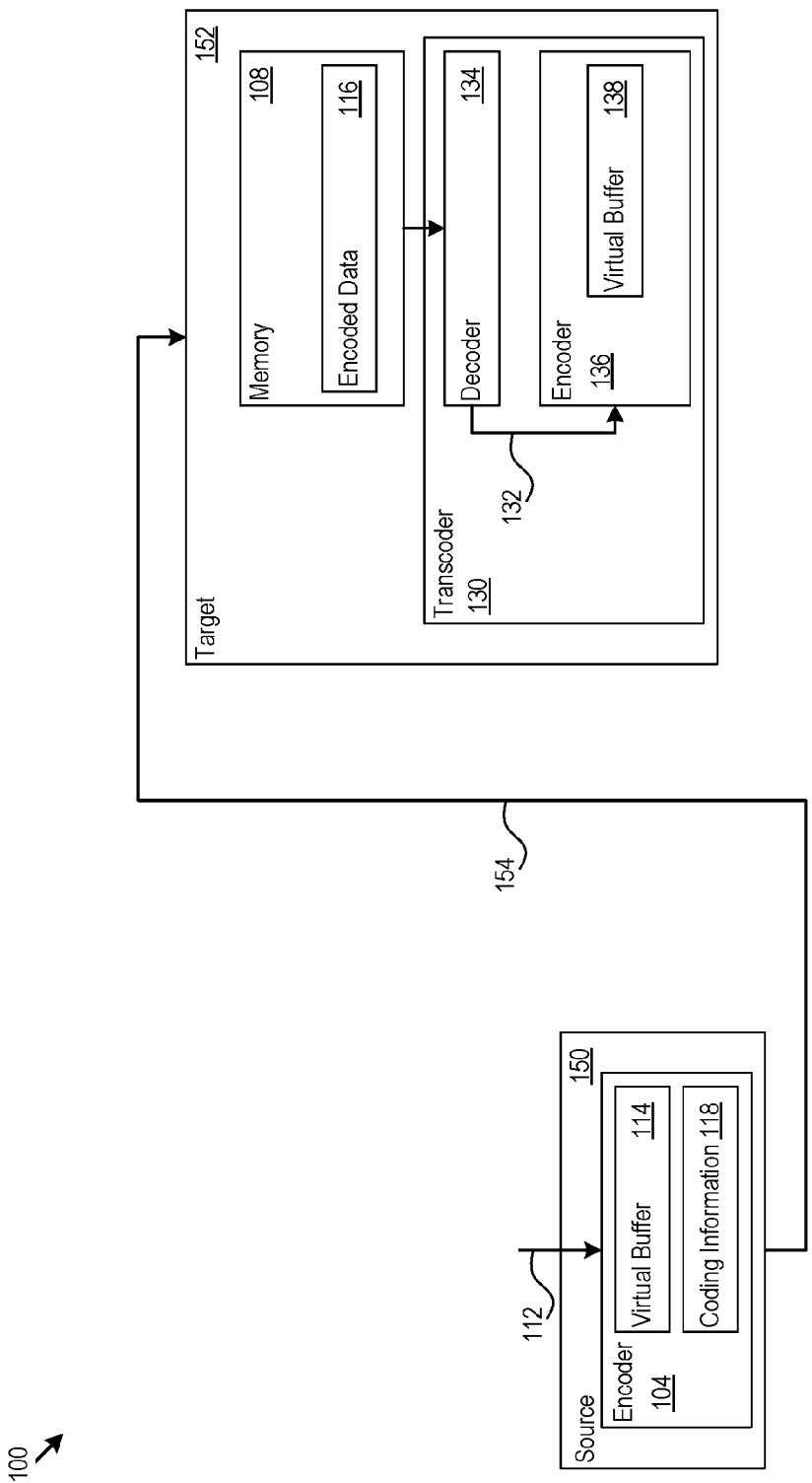
FIG. 1 shows an example architecture in which a source communicates with a target through a communication link.

FIG. 1 shows an example architecture 100 in which a source 150 communicates with a target 152 through a communication link 154. The source 150 or target 152 may be present in any device that manipulates image data, such as a DVD or Blu-ray player, streaming media device, a smartphone, a tablet computer, or any other device. The source 150 may include an encoder 104 that maintains a buffer, e.g., a virtual buffer 114. The target 152 may include memory 108 and a transcoder 130. The encoder 104 receives source data 112 (e.g., source image data) and may maintain the virtual buffer 114 of predetermined capacity to model or simulate a physical buffer that temporarily stores compressed output data. The encoder 104 may also control transmission of, e.g., encoded symbols, at a predetermined bit rate. The encoder 104 may specify the bit rate, as just two examples, in units of bits per pixel, or in units of bits per unit of time. The coding information 118 may be generated to assist coding operations at the target 152 as discussed below.

The encoder 104 may determine the bit rate, for example, by maintaining a cumulative count of the number of bits that are used for encoding minus the number of bits that are output. While the encoder 104 may use a virtual buffer 114 to model the buffering of data prior to transmission of the encoded data 116 to the memory 108, the predetermined capacity of the virtual buffer and the output bit rate do not necessarily have to be equal to the actual capacity of any buffer in the encoder or the actual output bit rate. Further, the encoder 104 may adjust a quantization step for encoding responsive to the fullness or emptiness of the virtual buffer. An exemplary encoder 104 and operation of the encoder 104 are described below.

The memory 108 may be implemented as Static Random Access Memory (SRAM), Dynamic RAM (DRAM), a solid state drive (SSD), hard disk, or other type of memory. The communication link 154 may be a wireless or wired connection, or combinations of wired and wireless connections. The transcoder may further include a decoder 134 and an encoder 136 to re-encode the coded content sent from the source. The encoder 136 may utilize the coding information 118 to assist in the re-encoding of the received coded content.

In an example scenario, the source device may include a headend with expansive processing power and capability, and the target device may include a mobile device or other device in with constrained computing resources, at least with respect to the headend processing capability. For example, the mobile device may have constrained power resources leading to slower clock rates, fewer floating point operations per second, shorter active periods, or other resource constraints. In the example scenario, the headend may supply a coded data stream using a first codec used by a significant portion of target devices, and the mobile device may transcode the coded data stream using a second codec. To provide support for both the first and second codecs, the headend may embed coding content indicators in the metadata of the coded data stream to assist with the transcoding operation.

In another example scenario, coded content may be received at a gateway device. The gateway device may provide coding indicators to assist device within a consumer premises. For example, a gateway device may provide coding information for a connected set-top-box or other connected device. Thus, a single and/or small number of central systems with expansive coding capabilities can be used to supplement the coding capabilities of a number of satellite devices.

In various implementations, different codecs may be used to perform coding operations, such as encoding, decoding, transcoding, and/or other coding operations. For example, codecs may include MPEG-1/2/4, H.263, the high efficiency video coding (HEVC), VP8 or VP9 available from Google, Daala, audio video standard 2 (AVS2), AVI, MPEG, and/or other codecs. Codecs may employ multiple modes which may be selected for differing coding conditions and resources.

Figure 2:
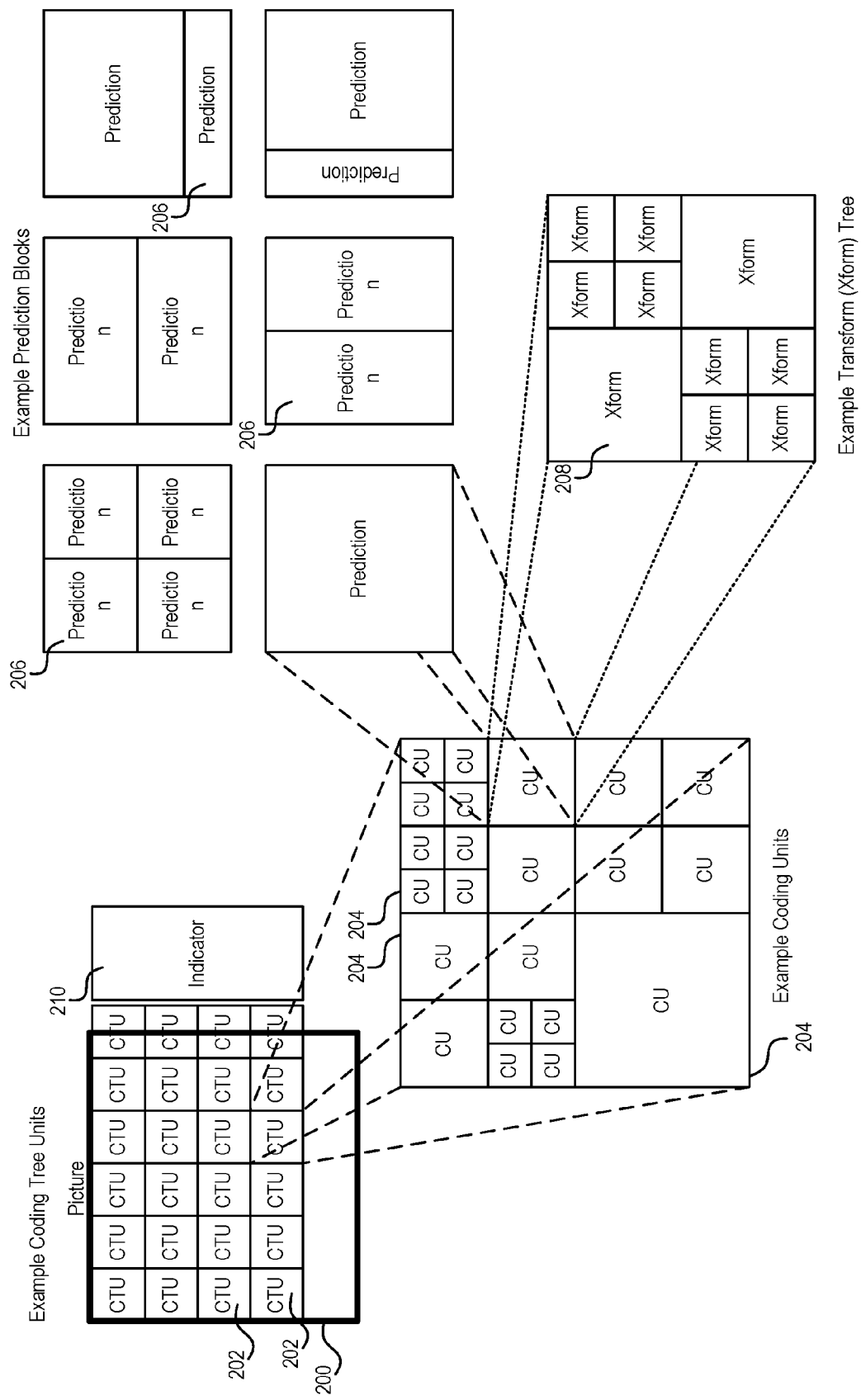
FIG. 2 shows an example block coding structure.

In various implementations, a coding mode may use a particular block coding structure. FIG. 2 shows an example block coding structure, in which different block sizes may be selected. As shown in FIG. 2, a picture 200 is divided into coding tree units (CTUs) 202 that may vary widely in size, e.g., 16×16 pixels or less to 64×64 pixels or more in size. A CTU 202 may further decompose into coding units (CUs) 204. A CU can be as large as a CTU and the smallest CU size can be as small as desired, e.g., down to 8×8 pixels. At the CU level, a CU is split into prediction units (PUs) 206. The PU size may be smaller or equal to the CU size for intra-prediction or inter-prediction. The CU 204 may be split into transform units (TUs) 208 for transformation of a residual prediction block. TUs may also vary in size. Within a CTU, some CUs can be intra-coded, while others can be inter-coded. Such a block structure offers the coding flexibility of using different PU sizes and TUs sizes based on characteristics of incoming content. In some cases, systems may use large block size coding techniques (e.g., large prediction unit size up to, for instance, 64×64, large transform and quantization size up to, for instance, 32×32) which may support efficient coding. An indicator 210 may be associated with one or more blocks to assist in prediction, transformation, motion estimation, or other tasks. The metadata may not necessarily be aligned with a particular CTU. For example metadata applicable to a first CTU may be received concurrently with a second CTU.

In some implementations, the system may adopt a large block size or another computationally complex mode to support high efficiency coding. For example, a large block may be determined by comparison to a predetermined size threshold, e.g., a block size greater than 32×32. However, an effective use of complex mode coding, such as use of large block coding tools, may involve a series of decisions. For example, splitting a CTU into a number of intra- or inter-coded CUs, may affect the coding efficiency. Splitting a CTU into one or more CUs or other complex mode decisions may use metrics, such as SAD (Sum of Absolute Difference) and SATD (Sum of Absolute Transform Difference). However, a metric, such as a rate-distortion optimization (RDO) metric which may consume more resources during calculation, may lead to overall gains once the increased efficiency for the complex mode is taken into account. For example, a pairing of the RDO metric and a large block size may allow for high quality video at high coding efficiency. Thus, supporting RDO calculations with coding content indicators from processing devices may allow for resource constrained systems to implement the coding efficiency gains of complex modes.

Various cost metrics may be computed based on a weighted combination of factors. The factors used may vary greatly among implementations. Two example factors are listed below:

TABLE 1

Example factors.

| Factor | Description |
| --- | --- |
| Distortion | Error caused by compression a block |
| Rate | Bits used to code the block |

In some cases, factors may be correlated. For example, increasing one factor may lead to a corresponding decrease or increase in another factor (e.g., a tradeoff, complement, or other relationship). For the example factors above, coded output with less distortion may use more bits to code (e.g., a higher bit rate). In some cases, the relative importance of the rate in relation to distortion may be a function of the desired video quality. In high bit-rate and high video quality situations, the number of bits consumed may be less important than in a low-bit-rate, low-video-quality situation. In various implementations, the assigned cost for a bit may be scaled by a weight (lambda) as shown below.

$$RD\ Cost = Distortion + \lambda \cdot Rate$$

In various implementations, other factors may be assigned a weight. For example, a weight may be assigned to distortion or a measure or motion within a group of frames. Factors used and weights assigned may vary greatly among differing implementations.

Figure 3:
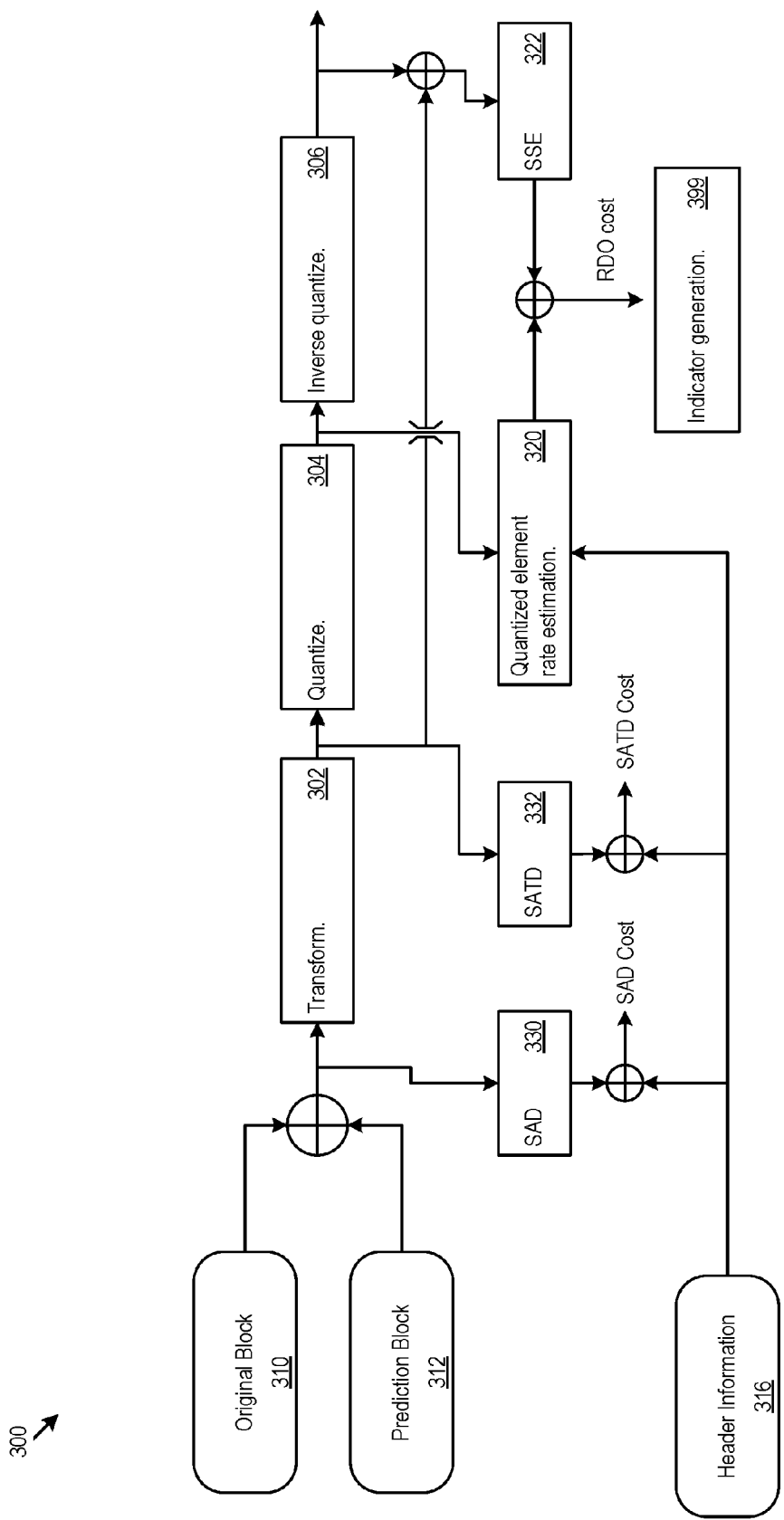
FIG. 3 shows example circuitry for cost metric calculation.

FIG. 3 shows example circuitry 300 for cost metric calculation. The example circuitry 300 may calculate the SAD, SATD, and/or RDO cost metrics. The example circuitry 300 for calculating the three metrics allows for calculation complexity comparisons. However, in various implementations, separate circuitry may be implemented to determine any one or more of the cost metric calculations. The RDO cost metric may be more complex to calculate than the SAD and SATD cost metrics. In FIG. 3, the original block 310 represents the block from the input stream that is currently being processed, and the prediction block 312 represents a block (either the intra-predicted block or an inter-predicted block) on which the prediction for the current block is based. The header information 316 represents information included in the input stream to support coding operations. Transformation 302, quantization 304 and inverse quantization 306 of the combined original block 310 and prediction block 312 inputs may be used by the circuitry 300 to calculate the distortion. For example, the distortion may include the error between the output of transformation 302 and the output of the quantization 306. The distortion is used in the RDO cost metric calculation. The SAD and SATD cost metric calculations may be formulated differently and may not include a distortion component. The SAD calculation 330 may use the SAD from the residual block being processed by the logic for the coding operation. The SATD metric may use a SATD 332 that is calculated using a transformed block. The SAD 330 and SATD 332 calculations need not necessarily use calculations dependent on quantization or inverse quantization. For rate estimation, the SAD and SATD metrics may use the rate estimation stored in the header information 316. However, the RDO metric may use additional rate estimation 320 from the quantized transform coefficients and the sum of the squared error (SSE) 322 obtained using the inverse quantization output. The calculation of different cost metrics may attach different weights to different factors. For example, pre-defined and/or configurable weights may be attached to a set of factors.

The logic 300 may be present at a processing device that generates a coding content indicator to assist a coding device in a coding task. Once one or more of the cost metrics are calculated, the values may be used to generate the indicator (399).

In some RDO-based implementations, the RDO calculation may be applied at individual coding stages. In some cases, the RDO calculation need not be applied for every individual coding stage. However, RDO calculations or other coding information sent from distributed processing devices may allow for low cost implementation of RDO computation. Therefore, RDO calculations may be used liberally when coding information is available, because implement the calculation may have a low impact of resource consumption from the stand-point of the coding device. It should be noted that the RDO coding information is still generated by the processing device. In some cases, the resource consumption of the processing device may also be considered. However, in many distributed coding schemes, the processing device is selected based on the processing device having a surplus of computing resources. Therefore, processing resources at the processing device may be considered less valuable than processing resources available at the coding device.

Figure 4:
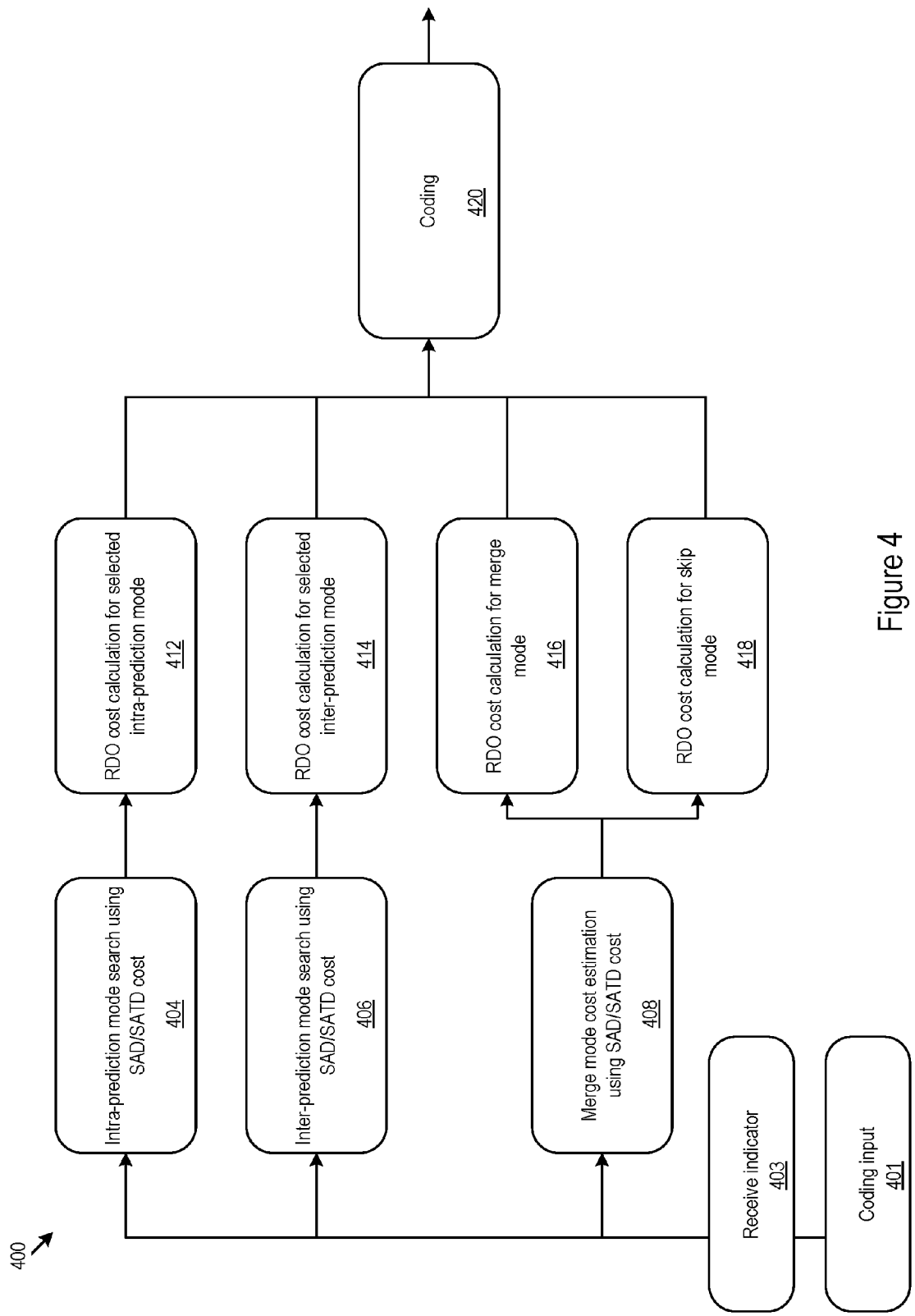
FIG. 4 shows an example rate distortion optimization based coder.

FIG. 4 shows an example RDO-based coder 400. The coder may accept a coding input (401), such as a CU. The coder may also receive a coding content indicator containing coding information to assist in coding (403). For example, the indicator may include cost metric values and/or estimates, transforms, motion estimates, and/or other coding information to support coding.

In the example coder 400, the RDO metric may be used for mode selection, block size selection, and/or other coding selection. SAD and/or SATD metrics may be used for intra mode searching (404), e.g. intra mode estimation, and inter-prediction motion vector search, e.g. motion estimation (406). Additionally or alternatively, the example coder 400 may use SAD and/or SATD metrics to perform merge mode cost estimation (408). In the merge mode, motion data from neighboring CUs may be inherited. After estimation, RDO cost determination may be performed for specific intra modes (412), inter modes (414), and merge modes (416), with competitive, (e.g. best, better, and/or other relative measure) SAD and/or SATD metrics. Additionally or alternatively, a RDO cost estimate for a skip mode (418) may be determined. For example, the RDO costs may be determined from a value or coding information provided in the received coding content indicator. In the skip mode, motion data may be inherited from neighbors and coefficients, such as luma and chroma, may be set to a predetermined setting (e.g., zero) for the CU. Based on the RDO costs, the coder may determine whether the current CU may be intra-coded or inter-coded. If the current CU is inter-coded, the coder 400 may further determine whether the current CU may select the inter-prediction mode, merge mode, or skip mode. The process can be repeated for CUs in a CTU. Coding (420) may be performed based on the coding selections.

Figure 5:
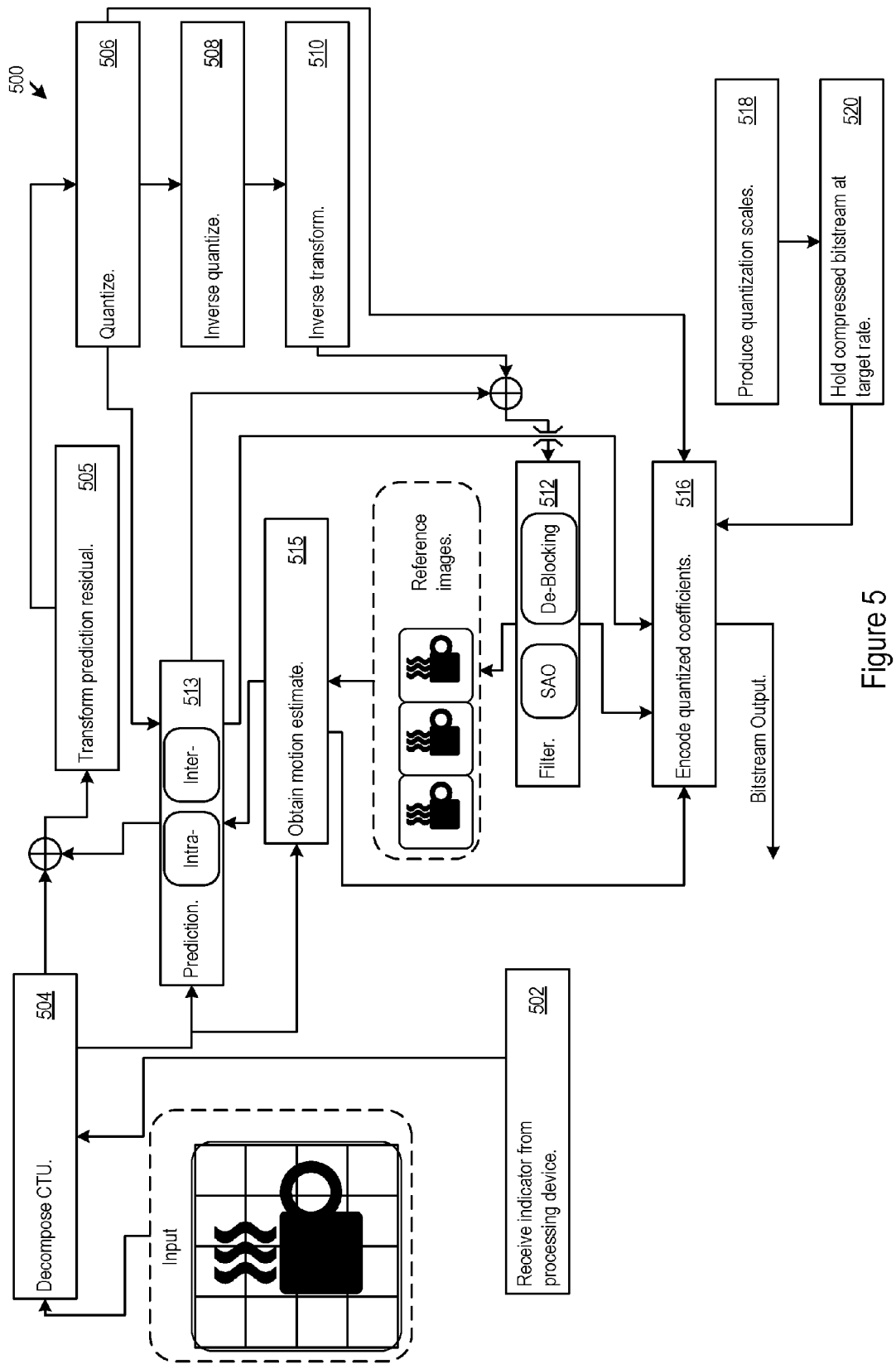
FIG. 5 shows example coding logic 500, which may be implemented on a coding device for coding tree unit processing.

FIG. 5 shows example coding logic 500, which may be implemented on a coding device for coding tree unit processing. The coding logic 500 may receive a coding content indicator from a processing device (502). The indicator may assist with and/or supersede various portions of the coding process. For example, the indicator may include motion estimates, cost metric calculations, and/or other coding information. The coding logic 500 may decompose a CTU into CUs (504). CU motion estimation and intra-prediction are performed to allow selection of the inter-mode and/or intra-mode for the CU. When motion estimation coding information is present in the received coding content indicator, the coding logic 500 may use the coding information to assist in motion estimation or in lieu of motion estimation. The coding logic 500 may transform the prediction residual (505). For example, a discrete cosine transform (DCT), a discrete sine transform (DST), a wavelet transform, a Fourier transform, and/or other transform may be used to decompose the block into frequency and/or pixel component.

In some cases, quantization may be used to reduce or otherwise change the number of discrete chroma and/or luma values, such as a component resulting from the transformation operation. The coding logic 500 may quantize the transform coefficients of the prediction residual (506). After transformation and quantization, the coding logic 500 may reconstruct the CU encoder via inverse quantization (508), inverse transformation (510), and filtering (512). In-loop filtering may include de-blocking filtering, Sample Adaptive Offset (SAO) filtering, and/or other filtering operations. The coding logic 500 may store the reconstructed CU in the reference picture buffer. The picture buffer may be allocated on off-chip memory to support large picture buffers. However, on-chip picture buffers may be used. At the CTU level, the coding logic 500 may encode the quantized transform coefficients along with the side information for the CTU (516), such as prediction modes data (513), motion data (515) and SAO filter coefficients, into the bitstream using a coding scheme such as, Context Adaptive Binary Arithmetic Coding (CABAC). The coding logic 500 may include rate control, which is responsible for producing quantization scales for the CTUs (518) and holding the compressed bitstream at the target rate (520).

Figure 6:
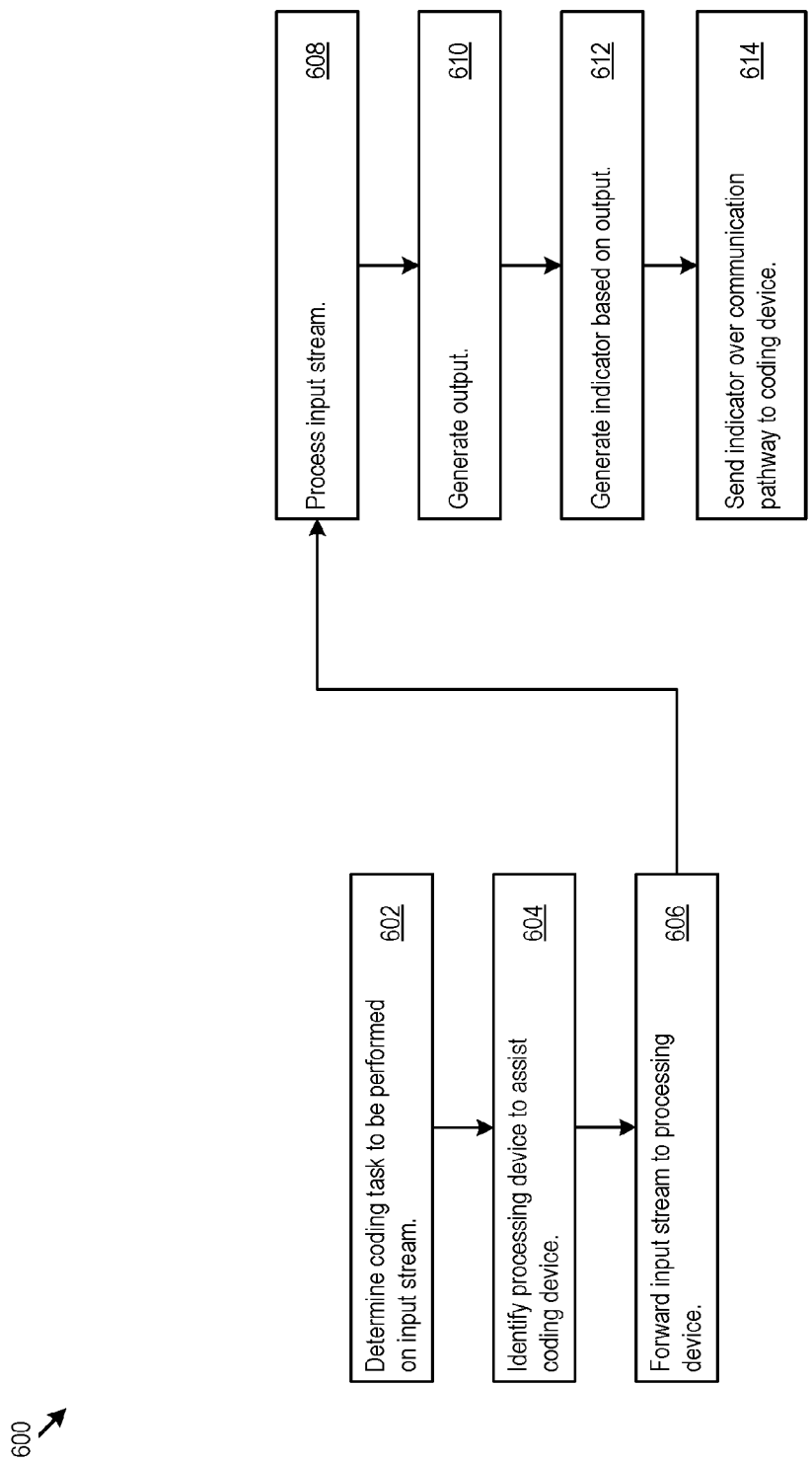
FIG. 6 shows example coding distribution logic 600, which may be implemented by circuitry.

FIG. 6 shows example coding distribution logic 600, which may be implemented by circuitry in the architecture 100. The coding distribution logic 600 may determine that a coding task may be performed on an input stream (602). For example, the coding distribution logic 600 may identify an input stream which may be encoded, decoded, transcoded, and/or coded in another manner by a coding device, such as a video processor, graphics processing unit, and/or coding device. The coding distribution logic 600 may identify a processing device to assist the coding device (604).

The processing device may include a processing device with underutilized bandwidth, a general purpose processor, a processor core, audio processor, and/or other processing device. The second processing device may be locally or remotely disposed with respect to the coding device. For example, the processing device may be a processor located on a headend and the coding device may be situated within a customer set-top-box. In another example, the processing device may be an audio processor located in the same set-top-box as the coding device. A remote processing device may communicate with the coding device over a wide-area-network, such as an Ethernet network, the Internet, an enterprise network, an internet service provider network, and/or other wide area network. A local processing device may communicate with the coding device over a communications bus, such as a peripheral component interface (PCI), an advanced graphics port (AGP), a universal serial bus, inter-integrated circuit ($I^2C$) and/or other communications bus. The coding distribution logic 600 may forward an input stream to the processing device (606). In response to receiving the input stream, the processing device may process the input stream to determine coding content (608). For example, the processing device may preform motion estimation and/or an RDO calculation on the input stream. The processing device may perform virtually any processing task on the input stream that is within the computational capabilities of the processing device. For example, the processing device need not be capable of coding to perform an RDO calculation, motion estimation, a transform, and/or other operations. Operations such as these may relieve processing duties from a coding-capable processor. For example, the processing device may lack a dedicated instruction set, library, and/or other data set that supports the coding task. However, it should be noted that in some cases, the processing device may have full coding capabilities and may perform coding operations as a portion of the processing task. The processing device may generate an output from the processing task (610).

In some implementations, a bi-directional distribute coding mode may be implemented. In a bi-directional coding mode the coding device may provide feedback to the processing device to aid in generation of the coding content indicator. For example, the coding device may supply a quantization parameter, lambda value, or other parameter that is used in the coding device as feedback to the processing device.

Based on the output, the processing device may generate a coding content indicator to assist in a coding task by the coding device (612). The indicator may include coding information for performing the coding task. For example, the coding information may include a RDO estimate and/or motion estimation for a coding block. Additionally or alternatively, coding information may include a transformation for a block. Coding information to support multiple portions of the coding task and/or multiple coding tasks may be combined into a single coding content indicator. The indicator may be sent over a communication pathway from the processing device to the coding device (614). For example, the indicator may be embedded in the stream and/or the metadata of the stream sent to the coding device. In some cases, sending the indicator along with the stream and/or metadata may allow for usage of the indicator even if there is not timing coordination present between the processing device and coding device. Additionally or alternatively, the coding content indicator may be sent via a communication link between the coding device and the processing device separately from the stream for which the coding content indicator provides coding information. Once the indicator is received by the coding device, the coding device may perform the coding task while using the indicator to assist in the coding task.

Figure 7:
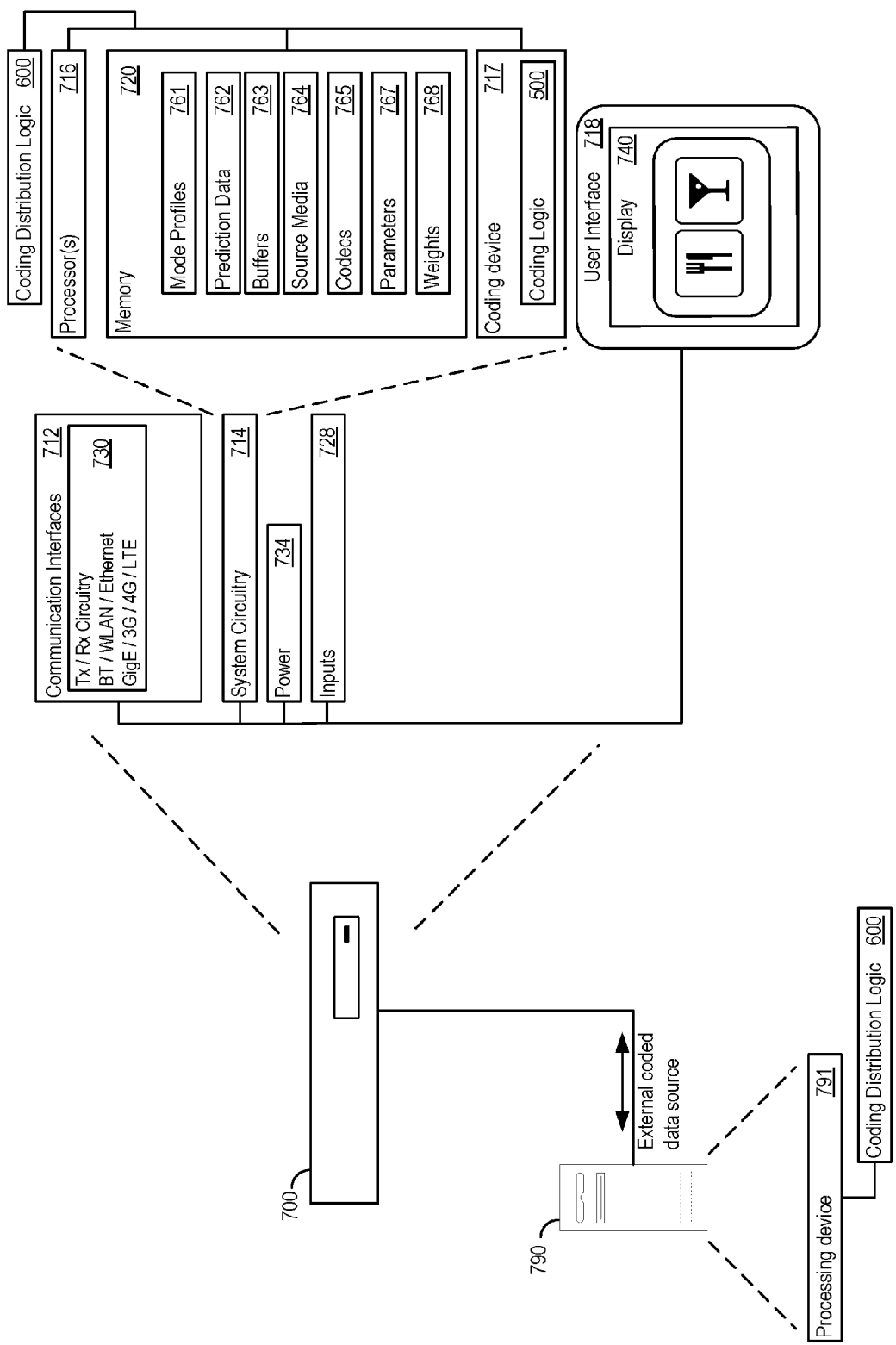
FIG. 7 shows an example coding system.

FIG. 7 shows an example coding system 700. The coding system 700 may include system circuitry 714 to support execution of the coding described above. The system circuitry may include processors 716 (e.g. graphics processing units, general purpose processors, audio processors, and/or other processing devices), memory 720, and/or other circuitry. The system circuitry may further include a coding device 717, which may in coders, video processors, graphics processing units, and/or other coding circuitry. The coding device 717 may implement the coding logic 500. Coding distribution logic 600 discussed above may be implemented processors 716, memory 720, and/or the coding device 717.

The memory 720 may be used to store the data and/or media for coding operations. For example, the memory 720 may store mode profiles 761, prediction data 762, buffers 763, source media 764, codecs 765, cost metric parameters 767 and weights 768, and/or other data to support the coding distribution logic 600, described above.

The coding distribution logic 600 may cause any of the processors 716 to generate coding content indicators to assist in coding tasks performed at the coding device 717. Additionally or alternatively, the coding distribution logic 600 may support reception of indicators from external sources. For example, the communication interfaces 712 may support communication with external coded data sources 790 which may include processing devices 791. For example, the coded data sources may include streaming video servers, headends, and/or other wide area network coded data sources. The external coded data sources 790 may transmit coding content indicators along with the coded data. The indicators may be embedded in the coded data, the coded data metadata, and/or sent along a separate communication pathway. In some cases, the external coded data sources may embed the coding content indicators independently of the coding task at the coding device. For example, the processing device may embed the coding content indicators to assist coding devices that perform one or more coding tasks. However, the coding task may be optional at the coding device. The coding device need not necessarily perform the associated coding task or tasks when a coding content indicator is present. Thus, the processing device and the coding device may act with or without coordination.

The coding system 700 may also include communication interfaces 712, which may support wireless, e.g. Bluetooth, Wi-Fi, WLAN, cellular (4G, LTE/A), and/or wired, ethernet, Gigabit ethernet, optical networking protocols. The coding system 700 may include power functions 734 and various input interfaces 728. The execution device may also include a user interface 718 that may include human interface devices and/or graphical user interfaces (GUI). The user interface may include a display 740 to present video, images, and/or other visual information and/or to the operator. In various implementations, the GUI may support portable access, such as, via a web-based GUI. The coded data, e.g. bitstream, from the coding logic 300 may be passed to the display for viewing by the operator. In various implementations, the system circuitry 714 may be distributed over multiple physical servers and/or be implemented as one or more virtual machines.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

What is claimed is:

1. A method comprising:
    receiving a video input stream at a processing device;
    processing the video input stream to obtain a motion estimate for a group of video frames within the video input stream;
    generating a coding content indicator comprising an indication of the motion estimate; and
    sending the coding content indicator to a coding device, the coding device different from the processing device, to assist the coding device in a coding task.

2. The method of claim 1, wherein sending the coding content indicator comprises sending the coding content indicator as metadata for the group of video frames.

3. The method of claim 1, further comprising:
    embedding the coding content indicator in a portion of the video input stream containing the group of video frames to generate a bitstream; and
    where sending the coding content indicator to the coding device comprises sending the bitstream.

4. The method of claim 1, wherein the coding task comprises encoding, decoding, transcoding, rate distortion optimization, motion estimation or any combination thereof.

5. The method of claim 1, wherein the processing device comprises a processor lacking a dedicated instruction set for at least a portion of the coding task.

6. The method of claim 5, wherein the processing device communicates with the coding device over a communications bus.

7. The method of claim 1, wherein the processing device communicates with the coding device over a wide area network.

8. A processing device comprising:
    a data interface configured to:
        receive an input stream; and
        send a coding content indicator to a coding device different from the processing device to assist the coding device in a coding task; and
    processing circuitry in data communication with the data interface, the processing circuitry configured to:
        process the input stream to obtain coding content; and
        generate the coding content indicator, the coding content indicator comprising an indication of a coding characteristic for the coding content.

9. The processing device of claim 8, wherein:
    the processing circuitry is further configured to produce an output stream using a first codec; and
    the coding device is configured to transcode the output stream using the indicator and a second codec different from the first.

10. The processing device of claim 8, wherein the coding content indicator comprises metadata for a portion of the input stream.

11. The processing device of claim 8, wherein the data interface is configured to output a bitstream including the coding content indicator and a portion of the input stream.

12. The processing device of claim 8, wherein the processing device operates independently of the coding device.

13. The processing device of claim 8, wherein the coding task comprises encoding, decoding, transcoding, rate distortion optimization, motion estimation, or any combination thereof.

14. The processing device of claim 8, wherein the data interface is configured to receive a feedback parameter from the coding device over a bi-directional link.

15. A product comprising:
    a machine-readable medium other than a transitory signal; and
    instructions stored on the machine-readable medium, the instructions, when executed, cause a processor to:
        receive an input stream at a processing device;
        process the input stream to obtain coding content;
        generate a coding content indicator for the coding content, the coding content indicator comprising an indication of a coding characteristic for the coding content; and
        send the indicator to a coding device, the coding device different from the processing device, to assist the coding device in a coding task.

16. The product of claim 15, wherein the instructions are further configured to cause the processor to send the indicator as metadata for a portion of the input stream.

17. The product of claim 15, wherein the instructions are further configured to cause the processor to embed the indicator in a portion of the input stream to generate a bitstream.

18. The product of claim 15, wherein the coding task comprises encoding, decoding, transcoding, rate distortion optimization, motion estimation or any combination thereof.

19. The method of claim 1, further comprising receiving a feedback parameter from the coding device at the processing device.

20. The method of claim 1, further comprising:
    processing the video input stream to determine a rate distortion metric value; and
    including the rate distortion metric value within the coding content indicator.

* * * * *